Figure 1:
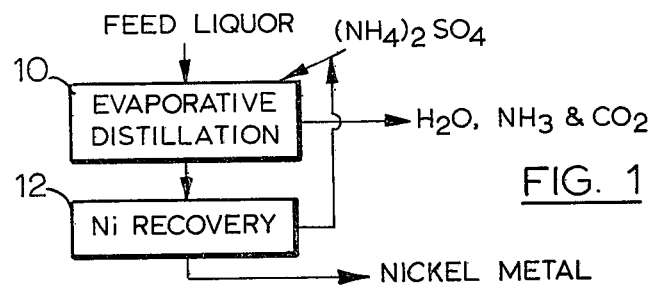

United States Patent [19]
Weir

[11] 3,928,020
[45] Dec. 23, 1975

[54] TREATMENT OF NICKEL-BEARING AMMONIUM CARBONATE LEACH LIQUORS

[75] Inventor: Donald Robert Weir, Fort Saskatchewan, Canada

[73] Assignee: Sherritt Gordon Mines Limited, Toronto, Canada

[22] Filed: July 10, 1973

[21] Appl. No.: 377,998

[52] U.S. Cl. .................... 75/.5 A; 75/103; 75/108; 75/119; 423/42; 423/50; 423/127; 423/129; 423/140; 423/144; 423/145; 423/146; 423/150

[51] Int. Cl.² ........................................ C22B 23/04

[58] Field of Search ............. 75/103, 108, 117, 119, 75/.5 A; 423/145, 146, 150, 140

[56] References Cited
UNITED STATES PATENTS

| | | | |
|---|---|---|---|
| 3,674,465 | 7/1972 | Evans et al. | 75/108 |
| 3,734,721 | 5/1973 | Seiht et al. | 75/119 X |
| 3,761,250 | 9/1973 | Weir et al. | 75/119 X |
| 3,816,098 | 6/1974 | Mackiw et al. | 75/119 X |

FOREIGN PATENTS OR APPLICATIONS
526,844   6/1956   Canada ................................ 75/108

Primary Examiner—Herbert T. Carter
Attorney, Agent, or Firm—Frank I. Piper; Arne I. Fors

[57] ABSTRACT

The process is disclosed for recovering elemental nickel from an impure aqueous ammoniacal ammonium carbonate liquor containing, in addition to nickel, one or more impurities such as sulphur, chlorine, cobalt, magnesium, manganese, iron, zinc and copper. According to the process, the composition of the liquor is first adjusted to contain at least 1.5 moles sulphur in the form of dissolved ammonium sulphate per mole of contained nickel. The resulting liquor is then heated to drive off ammonia and carbon dioxide to produce a nickel diammine sulphate solution from which elemental nickel is recovered. At least one mole of ammonium sulphate is formed in the solution per mole of recovered nickel and the sulphate containing solution is recycled, at least in part, to make up the sulphur requirements of the first step.

15 Claims, 3 Drawing Figures

FIG. 1

TREATMENT OF NICKEL-BEARING AMMONIUM CARBONATE LEACH LIQUORS

This invention relates to a hydrometallurgical process for recovering nickel in elemental form from nickel-bearing aqueous ammoniacal ammonium carbonate liquors and particularly from impure ammonium carbonate liquors containing, in addition to nickel, one or more impurities such as sulphur, chlorine, cobalt, magnesium, maganese, iron, zinc and copper. More particularly, the invention relates to a process wherein nickel values in aqueous ammoniacal ammonium carbonate liquor are converted to a nickel ammonium sulphate diammine salt from which nickel, in a relatively pure elemental state, may be readily produced.

Nickel bearing oxidic ores, such as the lateritic and garnieritic ores of Cuba, New Caledonia, Indonesia and the Philippines, for example, constitute the world's largest known reserves of nickel. Processes are known and in use for the recovery of nickel from such ores, but they are subject to economic and metallurgical problems due to the complex nature of the ores, their relatively low nickel contents and the necessity of treating very large tonnages of raw ore to obtain a commercially practical rate of production of nickel therefrom.

One well known process employed for the treatment of lateritic ore, known as the Nicaro process, involves roasting the ore under reducing conditions to reduce the nickel oxide of the material to crude metallic state. The reduced ore is then leached under oxidizing conditions with an aqueous ammoniacal ammonium carbonate solution to extract the metallic nickel and dissolve it in the leach solution as nickel ammine carbonate. Undissolved residue is separated from the leach solution and the clarified solution is heated to drive off ammonia and carbon dioxide and to precipitate the dissolved nickel as basic nickel carbonate. Precipitated basic nickel carbonate is separated from the solution and is decomposed by heating to form nickel oxide which may be marketed as such or reduced to metallic nickel.

A number of economic and metallurgical problems are encountered in the practice of this process. For example, some of the cobalt and copper in lateritic and garnieritic ores tends to be reduced and subsequently dissolved in the ammonium carbonate leach solution together with the nickel and to subsequently precipitate with and contaminate the basic nickel carbonate. In addition, contaminating impurities, such as zinc, manganese, magnesium and silica are also dissolved in the leach solution and precipitate with the nickel carbonate. Since these impurities are not removed during the basic nickel carbonate decomposition and the nickel oxide reduction steps, they also contaminate the final nickel product.

In an effort to overcome these problems, procedures have been developed and used by which the leaching and basic nickel carbonate precipitation steps are conducted specifically to minimize the dissolution and precipitation of cobalt and other soluble carbonate forming impurities; however, such procedures have the disadvantage of causing a loss of desired nickel values in the leaching and basic nickel carbonate precipitation steps as well, of course, as the loss of a substantial portion of the cobalt content of the ore treated. These problems and disadvantages have been overcome to some extent by more recently developed processes, such as that described in Canadian Pat. No. 854,112, for example. According to this process, cobalt and copper are substantially completely removed from the leach liquor prior to the basic nickel carbonate precipitation step by reacting it with a sulphidizing agent to precipitate cobalt and copper as sulphides. The cobalt and copper-free solution is then boiled to precipitate the dissolved nickel as basic nickel carbonate, the precipitate is separated from the barren liquor and is then re-dissolved in aqueous ammoniacal ammonium carbonate solution. Undissolved residue from this re-dissolution operation, which contains the bulk of the impurities such as magnesium, manganese, aluminum and silica, is separated from the solution, the ammonia and carbon dioxide contents are adjusted and the solution is then reacted with hydrogen at elevated temperature and pressure to reduce the nickel and precipitate it in elemental powder form. Whereas this process has a number of advantages over the conventional Nicaro process, it is nonetheless subject to problems which discourage its adoption for large scale commercial operations. Firstly, the cobalt-copper removal operation results in the removal of a significant amount of nickel from the liquor along with the copper and cobalt. As a result, this portion of the nickel is recovered from the leach liquor as a relatively low value mixed nickel-cobalt sulphide precipitate rather than being recovered as elemental nickel in the subsequent reduction step of the process. A second problem is that it is difficult to re-dissolve the basic nickel carbonate precipitate without employing at least two dissolution stages and this, of course, increases the equipment requirements and capital costs for the process considerably. Still another problem is that some metal impurities, and zinc in particular, are not always eliminated in the re-dissolution operation with the result that they tend to contaminate the nickel product.

These and other problems of the prior processes are largely overcome by the process of the present invention according to which nickel containing aqueous ammoniacal ammonium carbonate feed liquor is treated by first adjusting the composition of the feed liquor such that it contains at least about 1.5 moles sulphur in the form of dissolved ammonium sulphate per mole of contained nickel. The ammonium sulphate adjusted ammoniacal carbonate liquor is then heated to drive off carbon dioxide and ammonia and to produce a nickel-diammine sulphate solution. Elemental nickel is recovered from this solution with concurrent formation of ammonium sulphate which is recycled to supply, at least in part, the sulphur requirements of the feed liquor.

The process effectively permits recovery of substantially all of the nickel from the ammoniacal ammonium carbonate liquor as a high purity elemental nickel product. Many of the troublesome features of the conventional procedures for recovery of nickel from ammoniacal ammonium carbonate solution are avoided by the present process. For example, the present process does not require that the solution be boiled to precipitate nickel values nor that the nickel precipitate be separated from the barren solution and re-dissolved in two or more stages. The equipment requirement and capital operating costs for the process are therefore less than that for the prior process. Also, in the present process, there is no loss of nickel values with the discarded barren solution from the boiling step as is the case with the prior process. This is an important advantage since, although the discarded solution from the conventional process may contain as little as 0.05 g.p.l. of nickel, with the large volumes of solution handled in a commercial scale operation, the total nickel loss over a period of time is very substantial.

An additional important advantage of the instant process over the prior art process described above is that cobalt may be readily and substantially completely separated from nickel-cobalt containing solution produced by the instant process without concomitant loss of nickel values before the solution is subjected to hydrogen reduction for recovery of nickel. Thus, the nickel end product of the reduction operation is free of cobalt contamination and represents essentially the entire nickel content of the starting solution.

In its broadest aspect, the process of the present invention is independent of the source or manner of preparation of the impure ammoniacal nickel carbonate solution. However, for better understanding, it is described hereinafter as part of an integrated overall process for recovering nickel from leach solution derived from leaching reduction roasted lateritic ore. As such, it may optionally include a number of specific procedures for use when the source of the impure basic nickel carbonate is nickel ammonium carbonate leach solution obtained by methods such as those described in Canadian Pat. No. 811,078 for example. In most cases, such leach solutions contain, in addition to 5–20 grams per litre (g.p.l.) of dissolved nickel, impurities such as sulphur, cobalt, copper, magnesium, manganese, zinc, iron and silica.

Figure 2:
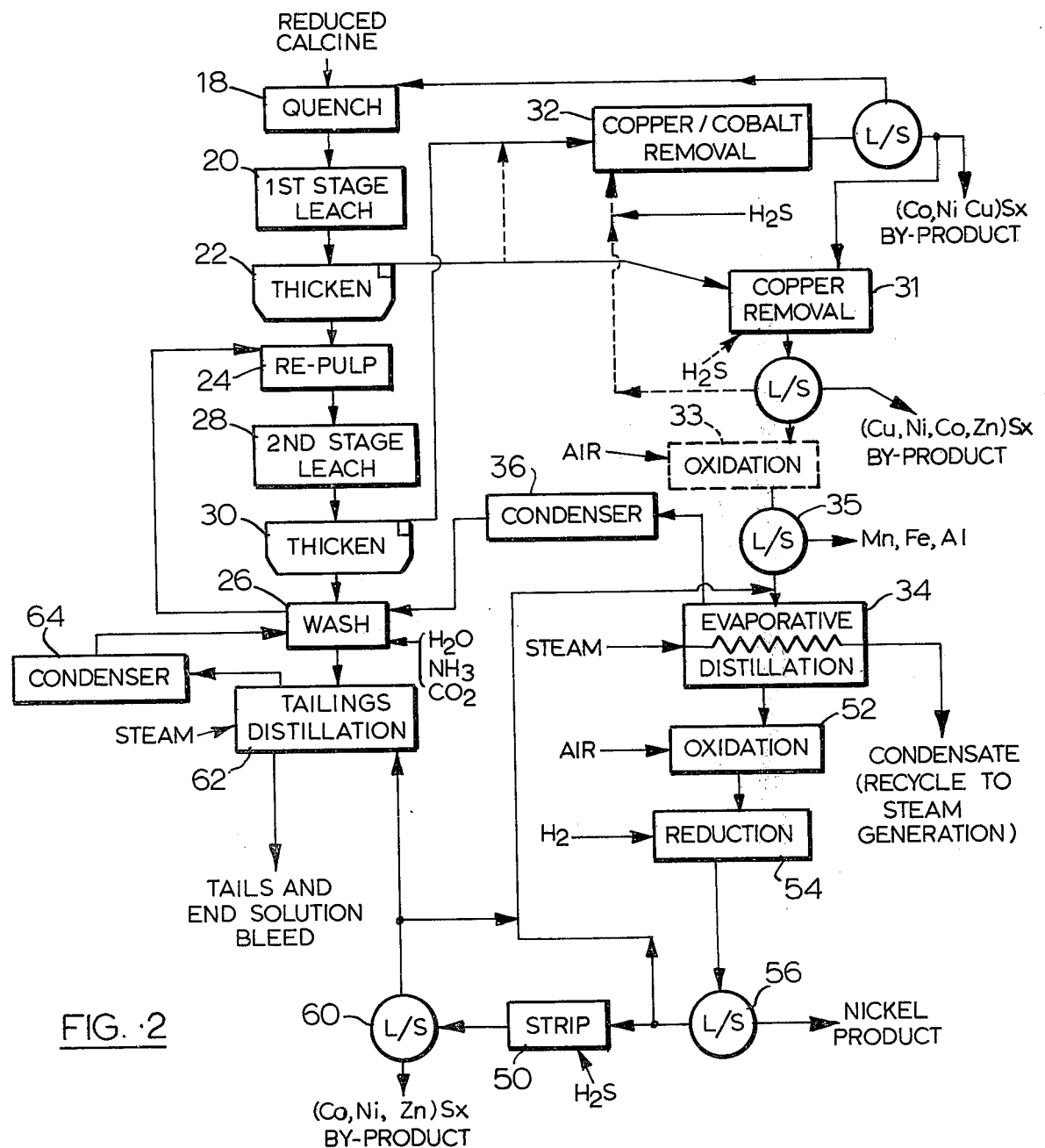
Figure 3:
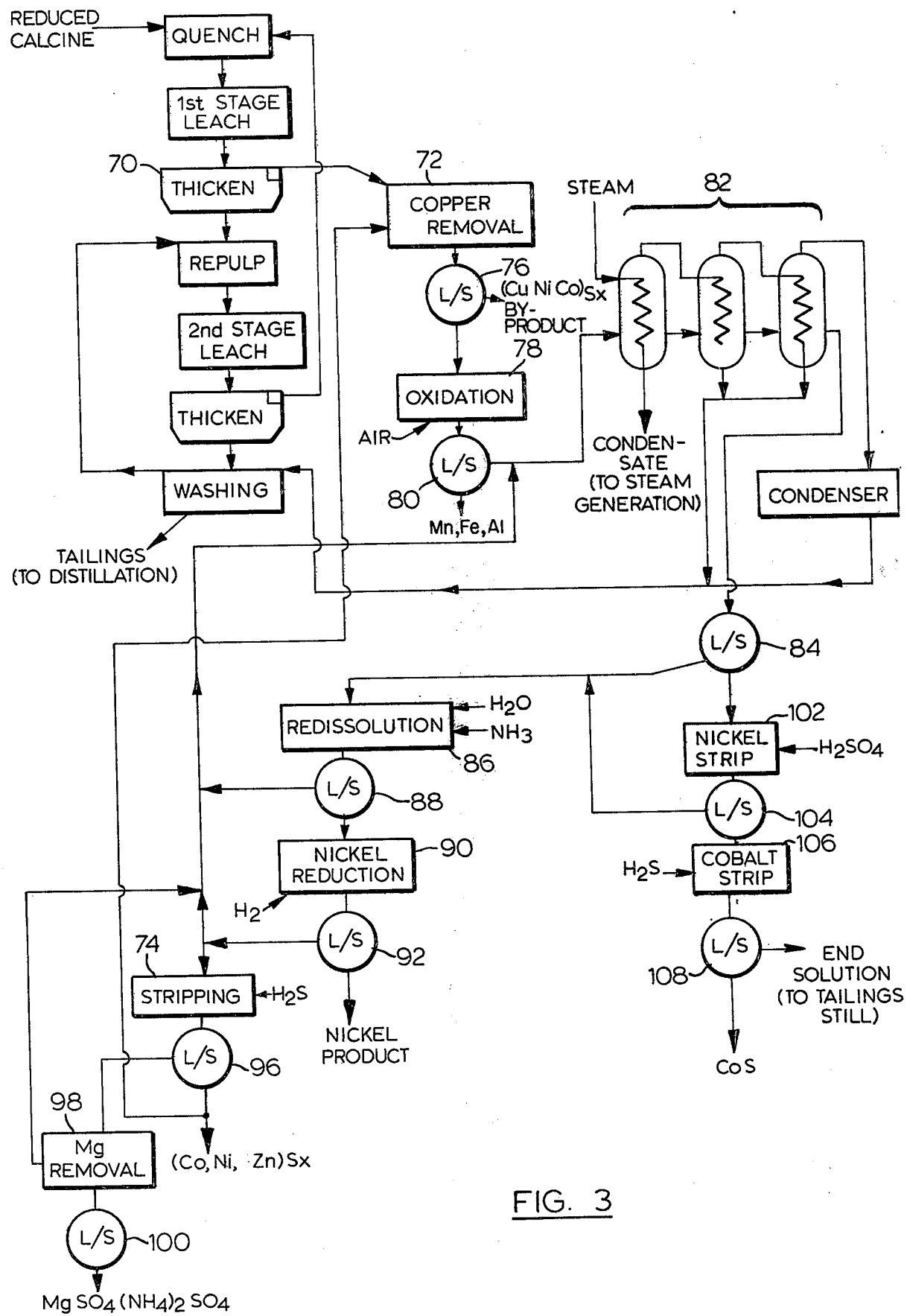

The process of this invention is described in detail below with reference to the accompanying drawings in which FIGS. 1, 2 and 3 are schematic flow diagrams illustrating three exemplary embodiments of the present invention.

FIG. 1 illustrates the process of the present invention in its broadest aspect. An ammoniacal ammonium carbonate feed liquor containing dissolved nickel is passed to evaporative distillation step 10. Sufficient ammonium sulphate is added to the feed liquor at step 10 to ensure that the resulting liquor contains at least about 1 mole of sulphur as sulphate per mole of nickel in solution plus at least 0.5 mole, and preferably 1 mole, in excess of that amount. The excess sulphate sulphur is required in order to avoid precipitation of nickel from solution as a basic nickel salt. When the process is initiated, an external source of ammonium sulphate is required. Solid or aqueous ammonium sulphate may be added to the liquor to make up the sulphate requirement. After the initial stage of the process, solution recycled to distillation step 10 from nickel recovery step 12 will usually contain sufficient ammonium sulphate and no additional ammonium sulphate will be required to maintain the required sulphate level during the distillation operation.

In distillation step 10, the sulphate-containing liquor is heated to convert contained nickel to a soluble nickel ammine sulphate complex and to eliminate substantially all carbonate ions from the solution. The heating temperature will depend on whether the distillation is conducted at atmospheric or subatmospheric pressure. For vacuum distillation, temperatures below 90°C. may be used. For atmospheric distillation, a temperature above about 90°C. is required. The solution is heated to drive off substantially all of the carbon dioxide and some ammonia as well as steam or water vapour. The distillation operation 10 may be conducted to effect a concentration of the nickel values in the solution through evaporation of water therefrom, for example where indirect heating is employed or it may be conducted with no change in nickel concentration or nickel concentration may be decreased through dilution of the solution, for example where direct steam injection is employed. However, the process can be employed to particular advantage to treat dilute nickel bearing ammoniacal ammonium carbonate solutions to simultaneously convert nickel values to the diammine sulphate complex, $Ni(NH_3)_2SO_4$, and increase the nickel concentration, through evaporation of water, to a level which is most suitable for the subsequent nickel recovery operation. For example, where the feed solution contains 5–20 g.p.l. of nickel, preferably sufficient water should be evaporated to increase the nickel content to about 45–65 g.p.l. thereby enhancing the efficiency of the subsequent nickel recovery steps.

The solution from evaporation step 10 is passed to nickel recovery step 12 wherein the solution is treated to recover nickel in elemental form and to form at least one mole of ammonium sulphate for each mole of elemental nickel recovered. Nickel may be recovered from the solution in a variety of ways. The solution may be treated directly to produce nickel, such as by hydrogen reduction or electrolysis, or it may first be subjected to various purification procedures depending on the quantity and nature of the impurities that may be present. For example, it may be desirable to subject the solution to an oxidation treatment to remove iron and manganese impurities and/or the solution may require special treatment to eliminate chloride contamination. In any case, once the nickel ammine sulphate solution of desired purity has been produced, it is generally preferred to recover the nickel by direct hydrogen reduction since this approach has the advantage of facilitating separate recovery of nickel and cobalt.

Solution containing regenerated ammonium sulphate from the hydrogen reduction or electrowinning recovery operation is recycled to distillation step 10 to supply the ammonium sulphate required to convert the nickel values in the feed solution to the complex nickel ammine sulphate. More or less solution may be recycled to distillation step 10 depending on the sulphur content of both the recycled solution and the feed solution. If both solutions contain insufficient sulphur, for example due to mechanical losses of solution, the deficiency must be made up from an external source.

FIG. 2 illustrates a flow scheme of a process suitable for recovery of nickel from a typical feed liquor derived from leaching reduced laterite ore. Such liquors usually contain, in addition to nickel, contaminants including sulphur, cobalt, iron, magnesium, aluminum, copper and zinc. The process is shown in conjunction with a two-stage leach operation in which reduced ore is first slurried with recycled leach solution in quench step 18 and then passed to a first stage leach step 20. Solution from first stage leach step 20 is separated from leach residue in thickener 22 and the residue is repulped at 24 in solution from washing operation 26. The repulped residue is passed to the second stage leach operation 28 and residue from the leaching operation is separated from solution in thickening step 30 and passed to washing operation 26. The overflow from thickener 22 may be passed entirely to copper removal step 31 or only a portion of the overflow may be passed to step 31 while the remainder is passed to cobalt and copper removal step 32 where sufficient sulphidizing agent, such as $H_2S$, $(NH_4)_2S$, NaHS or $Na_2S$ is added to precipitate a controlled quantity of cobalt. The initial cobalt content of the leach slurry make-up at quench step 18 may be controlled by controlling the cobalt content of liquid passing to quench step 18 from cobalt removal step 32 in accordance with the method described in Canadian Pat. No. 811,078.

In copper removal step 31, copper is precipitated from solution as a copper sulphide by the addition of mixed sulphide precipitate from Cu—Co removal step 32 and/or a sulphidizing agent such as $H_2S$. The preferred procedure is to utilize mixed sulphide precipitate alone unless the copper content of the solution is relatively high and it is found to be necessary to supplement the added sulphides with $H_2S$ or $(NH_4)_2S$ in order to obtain substantially complete copper removal. Use of mixed sulphides precipitate for copper removal is preferred because copper in the solution replaces nickel in the added sulphides thereby increasing the amount of nickel recovered in elemental form and correspondingly decreasing the amount recovered as a lower-valued mixed sulphide precipitate. In the case where no $H_2S$ is added in copper removal step 31, it is preferred to pass all the mixed sulphide precipitate from copper-cobalt removal step 32 to copper removal step 31 to provide optimum opportunity for replacement of nickel in the sulphides by copper. Where $H_2S$ is added in the copper removal step 31, the mixed sulphides precipitate is cycled to the coppercobalt removal step 32 as shown by the broken line in order to minimize nickel losses in the mixed sulphide precipitate.

Solution from the copper removal step 31 may be passed to optional oxidation step 33 or it may be passed directly to the evaporative-distillation step 34. In oxidation step 33, the solution is contacted with a free oxygen-containing oxidizing gas such as air at an elevated temperature, preferably in the range of about 65°C. to about 175°C. under a positive partial pressure of oxygen, preferably at about 30 p.s.i. for a time sufficient to precipitate the bulk of the manganese, aluminum and iron contaminants as hydroxides and carbonates. During this operation, the bulk of the unsaturated sulphur compounds in solution, e.g. more than 90% in most cases, are converted to sulphate form thereby supplying, in part, the sulphate requirements for the subsequent evaporative-distillation operation.

The manganese, aluminum and iron precipitate from oxidation step 33 is separated from solution in liquid-solids separation step 35. Solution from separation step 35 is passed to evaporative-distillation step 34. Sulphate-containing reduction end solution generated in subsequent reduction step 54 is combined with the solution from separation step 35 in order to increase the concentration of sulphur in the feed solution to evaporation step 34 to the required level of at least 1.5 mole and preferably 2–4 moles sulphur in sulphate form for each mole of nickel in the feed solution.

Evaporative-distillation step 34 is preferably carried out in two or more effects with the precise number for any given operation being dictated by an economic balance between capital and operating costs. In any case, the nickel bearing ammoniacal ammonium carbonate feed solution enters the first effect and is heated by indirect steam heat and heating for subsequent effects is provided by the heat in the vapours from the previous effect. As the feed solution is heated in each effect, a portion of the contained nickel values is converted to nickel diammine sulphate and gases comprising carbon dioxide ammonia and steam are evolved. The evaporative-distillation operation is conducted so that by the time the solution has passed through all the effects of the evaporative-distillation step substantially all nickel values in the feed solution are converted to the nickel diammine sulphate form. The condensed steam from the first effect may conveniently be recycled in the form of boiler feed water to the auxiliary steam generation facilities. The gases evolved from the other effects are passed to condenser 36 and the condensates are recycled to the washing step 26.

Solution from evaporative-distillation step 34 may contain sulphur in an unsaturated form such as thiosulphate and polythionate ions. If unsaturated sulphur values are present in the solution, the solution must be treated in an oxidation step 52 to ensure conversion of such values to a sulphate form. If this is not done, the nickel powder product from the subsequent reduction operation may be contaminated with insoluble sulphide sulphur compounds which are difficult to remove by post-treatment of the product. In the sulphur oxidation operation 52, solution from evaporative-distillation step 34 is charged into a pressure vessel suitable for effecting liquid gas contact and is heated to an elevated temperature, preferably within the range of about 65°C. to about 260°C., more preferably about 175°C. to about 230°C. The solution is actively agitated and an oxygen bearing, oxidizing gas, such as air, oxygen or oxygen-enriched air is fed into the solution at a rate sufficient to maintain a positive partial pressure of oxygen, preferably between about 20–80 p.s.i. This operation is continued until substantially all sulphur values in the system are oxidized to sulphate form. Generally, this operation requires a period of about 2 to 10 minutes. The oxidized solution is then passed to nickel reduction operation 54.

Nickel reduction operation 54 is conducted according to known procedures wherein nickel is preferentially precipitated from solution as a high purity metal powder by reaction of the solution with hydrogen at elevated temperature and pressure. This process, which is described in detail in numerous prior patents, including, for example, U.S. Pat. No. 2,734,821, results in production of elemental nickel powder and reduction end solution containing any cobalt not previously removed, a small residual amount of nickel, ammonium sulphate and minor amounts of impurities such as zinc and manganese. The nickel powder product is physically separated from the reduction end solution in liquid-solids separation step 56 and, after washing and drying, is ready for the market. Sufficient reduction end solution is recycled to the evaporative-distillation step 34 to make up the ammonium sulphate requirements of the feed solution to step 34. Sulphur from an external source may, of course, be added to the system to make up any sulphate ion deficiency.

Unrecycled solution from evaporative-distillation step 34 is passed to stripping operation 50 where it is treated with hydrogen sulphide or other sulphidizing agent to strip residual nickel and any cobalt values therefrom as a mixed sulphides precipitate. Other impurities in solution, such as zinc and manganese, which react with sulphide ions, will also be removed along with nickel and cobalt. Preferably, sufficient solution is passed through to stripping step 50 to maintain control of the level of Co, Mn and Zn in the system. The sulphides precipitate is separated in liquid-solids separation step 60 and is recovered as a by-product sulphides concentrate. Some of the solution separated in the sulphides separation step 60 preferably is passed through a tailings distillation step 62 and this permits recovery of the ammonia in the solution while providing a sufficient bleed for any sulphur and magnesium introduced with the feed liquor to prevent their build up in the system. Off gases from the tailings distillation step 62 are passed to condenser 64 and the condensate is passed to the washing step 26.

FIG. 3 depicts a process for treatment of a nickel containing ammoniacal ammonium carbonate liquor contaminated not only with the same impurities as the starting liquor of FIG. 2 but with chloride salts. Where the process contains no specific procedures for elimination of chloride salts, the level of such salts in the circuit will steadily increase as new chloride-contaminated feed liquor is treated and as nickel free but chloride containing solution is recycled to make up the sulphate requirement of the distillation-evaporation step. A solution containing in excess of about 0.5 g.p.l. chloride salts is highly corrosive and can only be treated in special corrosion-resistant equipment. The process illustrated in FIG. 3 incorporates a procedure for removal of chlorides so that special corrosion-resistant equipment is not required.

In FIG. 3, as in FIG. 2, the process is shown in conjunction with a two-stage leach operation. Overflow from first stage thickner 70 is passed to copper removal step 72 in which the solution is contacted with mixed sulphides separated from reduction end solution stripping operation 74. Precipitated copper sulphide is separated from solution in liquid-solids separation step 76. Solution from separation step 76 is passed to oxidation step 78. Step 78 is conducted under essentially the same conditions as oxidation step 33 of FIG. 2 and precipitated manganese, iron and aluminum impurities are separated in the form of oxides or basic carbonates in liquid-solids separation step 80. The copper free solution from separation step 80 is combined with reduction end solution containing ammonium sulphate to make up the feed solution to evaporative-distillation step 82.

In the particular scheme depicted in FIG. 3, evaporation and distillation are carried out in triple-effect evaporator-crystallizer. As in the scheme depicted in FIG. 2, the condensed vapours from the evaporative-distillation operation are collected and passed to the washing operation. Unlike the scheme of FIG. 2, however, evaporation is not discontinued as soon as conversion of nickel to a soluble complex nickel ammine, e.g. nickel diammine sulphate, is complete. Rather, the operation is continued to drive off substantially all of the ammonia complexed with the nickel to cause substantially all nickel to crystallize as nickel sulphate-ammonium sulphate double salt. Evaporation is also continued until sufficient ammonium sulphate has co-precipitated with the nickel double salt to provide the ammonium sulphate required to prevent precipitation of basic nickel sulphate salts at the elevated temperatures employed in the subsequent oxidation and reduction steps.

The chlorides, principally in the form of ammonium chloride, remain dissolved in the mother liquor and are separated from solids in liquid-solids separation step 84, preferably by centrifuging. Solids are passed to redissolution step 86 in which the nickel sulphate-ammonium sulphate double salt is dissolved in a solution containing ammonia to yield a nickel diammine sulphate-ammonium sulphate solution preferably containing 50–80 g.p.l. nickel. Undissolved salt crystals are separated at step 88 and recycled with reduction end solution to step 82.

Liquid from separation step 88 preferably is treated in nickel recovery step 90 by the same hydrogen reduction procedures as those described with reference to step 54 of FIG. 2. The nickel powder is then separated in liquid-solids separation step 92 thence washed and dried. A portion of the reduction end solution from separation step 92 is recycled to evaporative-distillation step 82 to supply the sulphate requirements of step 82 and the balance is passed to stripping operation 74. Operation 74 is operated under the same conditions as step 50 of FIG. 2 for separation of residual nickel and cobalt values as mixed sulphides. As previously noted, at least a portion of these mixed sulphides is recycled to copper removal step 72.

In the case where the incoming feed liquor contains sufficient magnesium to cause a build-up of magnesium in the system, solution from liquid-solids separation step 96 is passed to magnesium removal operation 98 where any dissolved magnesium salts are precipitated as a magnesium sulphate-ammonium sulphate double salt by cooling the solution to below about 35°C. The salts are removed in separation step 100 and the separated solution joins the stream of reduction end solution recycled to evaporative-distillation step 82.

The chloride containing mother liquor separated at step 84 is passed to nickel stripping operation 102 where sufficient sulphuric acid is added to solution to neutralize residual ammonia and to precipitate nickel values as nickel sulphate-ammonium sulphate salts. The nickel salt is separated at liquid-solids separation step 104, preferably by centrifuging, and passed to the redissolution step 86 along with the solids from operation 84.

Liquid from step 104 contains cobalt in a trivalent state and such cobalt is stripped at 106 with hydrogen sulphide and recovered as a cobalt sulphide precipitate in liquid-solids separation step 108. The liquid may be treated for recovery of ammonia from dissolved ammonium chloride salt, for example by distilling it along with the leach tailings from step 26 or it may be discarded.

It will be apparent from the foregoing that the basic concept of the present invention as described by reference to FIG. 1, can advantageously be incorporated into a variety of overall processing schemes to enable effective and efficient recovery of substantially pure nickel from ammoniacal nickel ammonium carbonate leach liquors.

I claim:

1. The process for recovering nickel in elemental form from a nickel-containing aqueous ammoniacal ammonium carbonate feed liquor which comprises the steps of: adjusting the composition of said liquor such that it contains at least about 1.5 moles of sulphur in the form of dissolved ammonium sulphate per mole of contained nickel; heating said so-adjusted ammoniacal ammonium carbonate liquor to drive off carbon dioxide and ammonia and to produce a nickel diammine sulphate solution having a nickel concentration at least equal to the nickel concentration of said feed liquor; recovering nickel in elemental form from said nickel diammine sulphate solution by reacting said solution (from said heating step) with hydrogen at elevated temperature and pressure to reduce contained nickel to elemental powder form and to produce a reduction end solution containing at least one mole of ammonium sulphate per mole of (recovered) elemental nickel produced; and recycling reduction end solution containing said ammonium sulphate to supply, at least in part, the sulphur requirements of said feed liquor composition adjustment step.

2. The process as claimed in claim 1 wherein the concentration of sulphur in the feed solution is adjusted to between 2 and 4 moles of sulphur in sulphate form per mole of nickel in said feed liquor.

3. The process as claimed in claim 2 wherein said feed liquor contains 5–20 g.p.l. of nickel and said heating step is conducted to evaporate sufficient water from said solution to concentrate the nickel values in said solution to about 45–65 g.p.l.

4. The process as claimed in claim 1 wherein said feed liquor contains, in addition to nickel, sulphur and undesired metal contaminants including at least one of iron, manganese and aluminum and said feed liquor prior to said heating step is contacted with a free oxygen-containing gas under pressure and at a temperature within the range of about 65°C. to about 175°C. for a period of time sufficient to ensure that at least a major portion of all sulphur in the feed solution is oxidized to sulphate form and to precipitate said metal contaminants as hydroxides and carbonates and said hydroxides and carbonates are separated from the so-treated feed liquor.

5. The process as claimed in claim 1 wherein said feed liquor contains copper in addition to nickel and said feed liquor is contacted with a mixed Ni-Co sulphide precipitate to precipitate said copper from solution as a sulphide precipitate.

6. The process as claimed in claim 1 wherein said feed liquor contains, in addition to nickel, undesired contaminants including copper and said feed liquor is contacted with a sulphidizing agent to precipitate said copper as a copper sulphide, said copper sulphide being removed from the resulting liquor.

7. The process as claimed in claim 1 wherein said nickel diammine sulphate solution from the heating step is reacted with a free oxygen-containing oxidizing gas at a temperature within the range of about 65°C. to about 260°C. and under partial pressure of oxygen between about 20 and about 80 psi to ensure that substantially all sulphur contained therein is converted to sulphate form.

8. The process as claimed in claim 7 wherein said feed liquor contains both nickel and cobalt and said nickel diammine sulphate solution from the heating step is reacted with hydrogen at elevated temperature and pressure under controlled conditions to preferentially precipitate nickel in elemental powder form while leaving substantially all the said cobalt in the end solution from said nickel precipitation operation.

9. The process as claimed in claim 8 wherein at least a part of said reduction end solution recycled to the feed liquor is first reacted with a sulphidizing agent to precipitate substantially all cobalt and any residual nickel therefrom as a mixed sulphide.

10. The process as claimed in claim 9 wherein said feed liquor contains sulphur in addition to nickel and cobalt and a sufficient quantity of said end solution that has been treated with sulphidizing agent is bled from the system to prevent a build-up of the sulphur level in recycled solution.

11. The process for recovering nickel in elemental form from a nickel-containing aqueous ammoniacal ammonium carbonate feed liquor which is contaminated with chloride ions which comprises the steps of: adjusting the composition of said liquor such that it contains at least about 1.5 moles of sulphur in the form of dissolved ammonium sulphate per mole of contained nickel; heating said so-adjusted ammoniacal ammonium carbonate liquor to drive off carbon dioxide and ammonia and to evaporate water therefrom; continuing said heating to form and precipitate a nickel sulphate-ammonium sulphate double salt while leaving said chloride ions in solution; separating said chloride ion containing solution from said precipitated double salt; dissolving said double salt in an ammoniacal solution to form nickel diammine sulphate solution, reacting said nickel diammine sulphate solution with hydrogen at elevated temperature and pressure to reduce contained nickel to elemental powder form and to produce a reduction end solution containing at least 1 mole of ammonium sulphate per mole of elemental nickel produced and recycling reduction end solution containing said ammonium sulphate to supply, at least in part, the sulphur requirements of said feed liquor composition adjustment step.

12. The process as claimed in claim 11 wherein said feed liquor contains nickel and undesired contaminants including copper and at least one of cobalt and zinc, said reduction end solution is contacted with a sulphidizing agent to precipitate any contained nickel, cobalt and zinc as sulphides, said precipitated sulphides is separated from the resulting reduction end solution and at least a portion thereof is recycled and added to said feed liquor prior to the heating step in order to precipitate contained copper as copper sulphide.

13. The process as claimed in claim 11 wherein said feed liquor contains nickel, sulphur and undesired contaminants including at least one of aluminum, iron and manganese, said feed liquor prior to said heating step is contacted with a free oxygencontaining gas at a partial pressure of oxygen of at least 5 p.s.i. and at a temperature within the range of about 65°C. to about 175°C. for a period of time sufficient to ensure that substantially all sulphur values in the feed solution are oxidized to sulphate form and to precipitate said contaminants as hydroxides and carbonates and said hydroxides and carbonate are separated from the resulting feed liquor.

14. The process as claimed in claim 11 wherein said feed solution contains cobalt in addition to nickel, said chloride ion containing solution remaining after separation of precipitated nickel double-salt is combined with sufficient sulphuric acid to neutralize residual ammonia and to precipitate any contained nickel values as nickel sulphate-ammonium sulphate doublesalt which is separated from solution, said resulting solution is contacted with a sulphidizing agent to cause contained cobalt values to precipitate as cobalt sulphide, and the resulting solution is separated from said cobalt sulphide precipitate and is bled from the system in sufficient quantity to prevent the buildup of chloride ions in the recycled solutions.

15. The process as claimed in claim 11 wherein said feed liquor contains magnesium in addition to nickel, said reduction end solution is cooled to below about 35°C. to cause contained magnesium values to precipitate, precipitated magnesium values are then separated from said cooled reduction end solution and said cooled reduction end solution is recycled and combined with said feed liquor.

* * * * *